United States Patent
Jibry et al.

(10) Patent No.: US 6,804,073 B2
(45) Date of Patent: Oct. 12, 2004

(54) VARIABLE GAIN AMPLIFIER CONTROLLER

(75) Inventors: Rafel Jibry, Bristol (GB); Peter Walsh, Burnham-On-Sea (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 09/984,625

(22) Filed: Oct. 30, 2001

(65) Prior Publication Data

US 2002/0051309 A1 May 2, 2002

(30) Foreign Application Priority Data

Oct. 31, 2000 (GB) .............................................. 0026623

(51) Int. Cl.⁷ .............................. G11B 5/09; G11B 5/03; G11B 5/02
(52) U.S. Cl. .............................. 360/46; 360/67; 360/66
(58) Field of Search .............................. 360/46, 66, 39, 360/29, 67; 369/47.15, 32.01, 33.01

(56) References Cited

U.S. PATENT DOCUMENTS

| | | | |
|---|---|---|---|
| 4,953,041 A | * 8/1990 | Huber | 360/46 |
| 5,375,145 A | 12/1994 | Abbott et al. | 375/98 |
| 5,422,760 A | * 6/1995 | Abbott et al. | 360/46 |
| 5,771,131 A | * 6/1998 | Pirzadeh | 360/77.08 |
| 5,791,790 A | * 8/1998 | Bender et al. | 358/1.16 |
| 6,061,192 A | 5/2000 | Ogiwara | 360/46 |
| 6,249,890 B1 | * 6/2001 | Ukani et al. | 360/53 |
| 6,304,400 B1 | * 10/2001 | Schneider | 360/65 |
| 6,519,715 B1 | * 2/2003 | Takashi et al. | 360/53 |
| 6,525,891 B1 | * 2/2003 | Tsunoda | 360/25 |
| 6,583,943 B2 | * 6/2003 | Malone, Sr. | 360/48 |
| 6,594,103 B1 | * 7/2003 | Despain et al. | 360/77.06 |
| 6,621,649 B1 | * 9/2003 | Jiang et al. | 360/67 |

FOREIGN PATENT DOCUMENTS

| | | |
|---|---|---|
| GB | 2311902 | 10/1997 |
| GB | 2239324 | 1/2000 |

* cited by examiner

*Primary Examiner*—David Hudspeth
*Assistant Examiner*—Glenda P Rodriguez

(57) ABSTRACT

Apparatus responsive to a signal derived by a magnetic transducer includes a variable gain amplifier arrangement having an input responsive to the signal and an output terminal. An analog gain control circuit responds to the signal at the output terminal. An analog to digital converter responds to the signal at the output terminal. Circuitry responsive to an output signal of the analog gain control circuit and an output signal of the analog to digital converter causes the gain of the variable gain amplifier to be simultaneously controlled in response to gain control output signals resulting from the output signals of the analog gain control circuit and the analog to digital converter. Both gain control output signals are derived in response to the same instantaneous value of the output signal at the output terminal of the variable gain amplifier arrangement.

42 Claims, 4 Drawing Sheets

VARIABLE GAIN AMPLIFIER CONTROLLER

TECHNICAL FIELD

This invention relates to a data reader and methods of reading data. It is particularly applicable to data storage devices, but has wider applicability.

This invention will be described in detail in relation to magnetic tape data storage systems, although it has wider applicability and may be applied to any number of different types of data receiving system.

BACKGROUND ART

In any form of data storage system, data is stored on a physical medium. A reading mechanism is provided with which data can be retrieved from the physical medium. In storage systems such as magnetic tape data storage system the physical medium can undergo random, unpredictable, fluctuations. In the case of magnetic tape drives the physical separation of the tape and the read head can vary significantly and so provide the random fluctuations. The random fluctuations can attenuate the strength of the signal being read from the physical medium. In general, such attenuation must be accounted for before data read from the medium can be successfully decoded.

Another example of such random fluctuations is in the field of hard disk drives in which the height of the read head above the disc platter can vary, and cause similar fluctuations. However, fluctuations of this kind tend to be far less pronounced and significant than in magnetic tape data storage systems. Such fluctuations could also occur due to variations in the quality of the storage medium.

Means for compensating for the attenuation is well known. In some embodiments the means comprises an automatic gain control (AGC), which adjusts the amplification applied to the signal produced by the read head to compensate for the attenuation arising from the random fluctuations. However, some prior arrangements of AGC have not operated as effectively as may be desired.

It is known to use such AGC's to control a variable gain amplifier such that the signal is amplified appropriately to account for the fluctuations and an example of a known arrangement is shown in FIG. 1. It is known to provide analogue automatic gain controls, which are fast but do not control the gain of the amplifier as accurately as is desired. It is also known to provide digital automatic gain controls, which due to the digital filtering, and processing required before a signal can be input thereto, are slow (and therefore, cannot respond to rapid changes), although they allow the gain of the amplifier to be accurately controlled.

It is also known to provide both an analogue and a digital gain control in independent loops, but such implementations have been difficult to control, and are complicated to fabricate.

In U.S. Pat. No. 5,375,145, which relates specifically to bard disk drive systems, both digital and analogue variable gain control feedback loops are provided and feed back their respective signals to plural variable gain amplifier stages. According to this patent, the analogue gain control loop is active to vary gain control only during a non-reading mode of operation. During a reading mode, the analogue gain control loop is static (i.e. its gain control is fixed and does not vary) and the digital gain control feedback loop is active to provide fine adjustments to the 'set-point' of the analogue gain control feedback loop.

It is an object of the present invention to provide a data reader and method of reading data that can accommodate random fluctuations, of the kind particularly exhibited by magnetic tape data storage systems.

DISCLOSURE OF THE INVENTION

According to a first aspect of the invention there is provided a data reader arranged to produce an output signal on reading a data signal, comprising processing circuitry being arranged to produce said output signal, said processing circuitry including at least a first and a second feedback loop, each of the feedback loops being arranged to produce a feedback signal that varies in response to variations in the data signal, said first feedback loop having a first characteristic and said second feedback loop having a second characteristic, the processing circuitry being arranged to apply more weight to the varying feedback signal of the feedback loop having the appropriate characteristic to control processing of said data signal at a particular instance.

An advantage of such a device is that the different characteristics of the feedback loops of the processing circuit can be employed to help ensure that the data signal is decoded accurately.

The data signal may be produced by the reading of a data-holding medium, or by the reception of a signal over a data transmission medium. The data-holding medium may be any one of the following: a tape, a hard disk drive platter, a CDROM, a DVD-ROM, any other computer readable data carrier. The data transmission medium may be any one of the following: electromagnetic waves, infrared links, other optical links (An infra red link may correspond to the IRDA protocol).

An initial amplifier may be provided to perform initial conditioning of the data signal. Preferably, the initial amplifier is a variable gain amplifier. The processing circuitry is preferably arranged such that the feedback signals control the gain of the variable gain amplifier. Such an arrangement is advantageous because it provides a convenient structure, which can be used to initially condition the signal.

Conveniently, a summer is provided that sums the feedback signals produced by each of the feedback loops and produces a summed feedback signal. The variable gain amplifier may be arranged such that the summed feedback signal controls its gain.

At least one of the feedback loops includes a feedback signal producer arranged to produce the feedback signal of that feedback loop. Preferably, each of the feedback loops includes a feedback signal producer arranged to produce the feedback signal of that loop.

Conveniently, at least one of the feedback signal producers is an automatic gain control.

Conveniently, at least one of the feedback loops may be arranged so that the feedback signal producer therein has an analogue signal input thereto. Feedback signal producers working in the analogue domain have the advantage that they have a quick response time and therefore can rapidly respond to fluctuations in signals input thereto. However, it can be difficult to provide analogue signal producers that are as accurate as may be desired.

In some embodiments there may be provided a plurality of feedback loops having feedback signal producers therein arranged to have an analogue signal input thereto.

The or each analogue feedback signal producer may be arranged to produce the feedback signal by applying thresholds to an analogue signal input thereto. As the skilled person will appreciate the analogue feedback signal producer may be arranged to produce the feedback signal by detecting analogue signal amplitude or power in any other suitable manner.

Further, at least one of the feedback loops may be arranged such that the feedback signal producer therein has a digital signal input thereto. Feedback signal producers working in the digital domain tend to be more accurate (i.e. control the gain to a closer tolerance) than those working in the analogue domain. However, in the data reader of the current invention the digital signal input to the feedback signal producer may be produced using a digital filter. Such a digital filter will introduce a time lag into the digital signal and, therefore, the feedback signal producer may not respond to fluctuations in the signal from the data reader as quickly as may be desired. Further, AGC's working in the analogue domain can be read-data-pattern dependent which is undesirable and it is therefore advantageous to use an AGC working in the digital domain.

In some embodiments there may be provided a plurality of feedback loops having feedback signal producers therein arranged to have a digital signal input thereto. Conveniently, an analogue to digital converter is provided to digitise the analogue signal produced by the initial amplifier. The processing circuitry may be arranged to pass the analogue signal produced by the initial amplifier to the analogue feedback signal producer. Further, the processing circuitry may be arranged to pass the digitised analogue signal to the digital feedback signal producer.

In some embodiments a digital amplifier may be provided, which is conveniently arranged to receive the signal from the analogue to digital converter.

Feedback loops may be provided and arranged to alter the gain of the digital amplifier.

Advantageously, the first feedback loop may be arranged to have a short time constant. Such an arrangement is advantageous because it can rapidly adjust the gain of the variable gain amplifier as appropriate.

The first feedback loop may be arranged to respond within roughly 10 bits of data to within 10000 data bits. The time constant will vary depending upon the application in which the data reader is being used. The time constant may be programmable. Any number of bits in between these limits may also be possible. For instance roughly any one of the following number of bits may be possible: 50, 100, 150, 250, 500, 1000, 2500, 5000, 7500, (or any number in between).

Further, the second feedback loop may be arranged to have a longer time constant than the first feedback loop. This is advantageous because it may mean that the produced feedback signal is more accurate.

At least one of the feedback loops comprises a scaler arranged to scale the feedback signal present in the feedback loop. Preferably, each of the feedback loops is provided with a scaler. Such scalers provide a convenient way of controlling which of the feedback loops carries the greatest weight to control processing of said signal. Preferably, the processing circuitry is arranged to alter the scale applied by the scalers to adjust the weight applied to each of the feedback signals.

The processing electronics may be arranged to alter the scalers, such that the value of one scaler affects the value of other scalers. In some embodiments the value of one scaler may alter the value of other scalers according to a known function.

A signal-processing block may be provided to produce an output signal from the data reader, and conveniently the signal-processing block has as its input the digitised analogue signal produced by the initial amplifier.

Preferably the processing circuitry is arranged to control the value of the scalers based upon the results of statistical analysis on the output signal.

The processing circuitry may be arranged to vary the value of the scalers during operation of the data reader. This varying may provide for different modes of operation, for example to provide a defect-handling mode.

According to a second aspect of the invention there is provided a data-receiving device incorporating a data reader according to the first aspect of the invention.

The data-receiving device may be any form of device arranged to receive a signal. For example the data-receiving device may be a telephone (may be a mobile telephone), a MODEM, a network card, a network router (or switch, hub, bridge, etc.), a printer, etc.

Alternatively, or additionally, the data-receiving device may be a data storage device.

In one embodiment the data storage device is arranged to receive magnetic tapes wherein the magnetic tape provides the data-holding medium. However, the device may be arranged to read data from a hard disk wherein the disk platter is the data-holding medium. The storage device may be arranged to read data from other forms of data-holding medium.

According to a third aspect of the invention there is provided a method of reading a data signal to produce an output signal comprising initially conditioning said data signal, the initial conditioning being controlled by at least two feedback loops of differing characteristics, the method comprising changing the weight applied to each of the feedback loops to make use of the appropriate characteristic.

At least one of the feedback loops may have a digital signal as an input and generate a feedback signal. Further, at least one of the feedback loops may have an analogue signal as an input and generate a feedback signal.

The initial conditioning of the signal may be to remove unwanted amplitude variations present on the signal produced on reading the data signal.

The method may apply a scaling factor to at least one of the feedback signals, and preferably, a scaling factor is applied to each feedback signals. Such scaling factors provide a convenient way of adjusting the weight given to the feedback loops.

Each of the feedback signals may be summed, and the summed feedback signal used to control the initial conditioning of the signal produced on reading the data signal.

The method may ensure that at least one of the feedback loops has a short time constant and can therefore respond rapidly, to fluctuations in the signal produced reading the data signal.

The method may further ensure that at least one of the feedback loops can accurately remove unwanted fluctuations in the signal produced on reading the data signal.

BRIEF DESCRIPTION OF THE DRAWINGS

There now follows by way of example only a detailed description of the present invention with reference to the accompanying drawings of which.

BEST MODE FOR CARRYING OUT THE INVENTION & INDUSTRIAL APPLICABILITY

Figure 3:
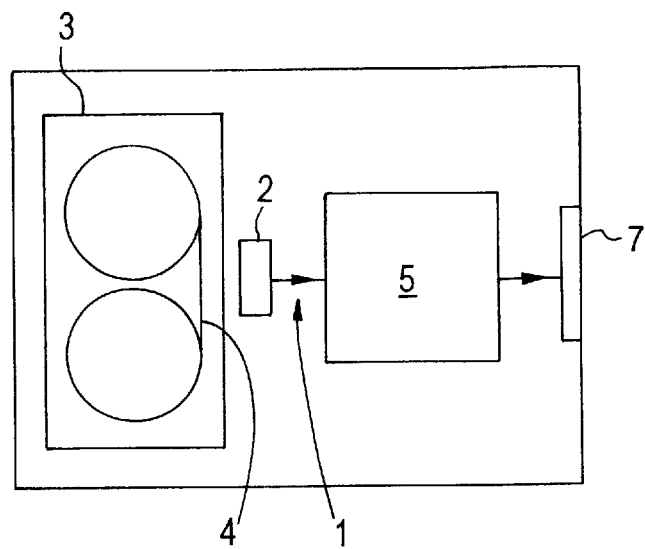
FIG. 3 shows a schematic diagram of a magnetic tape storage device according to the invention.

This invention will be described in relation to magnetic tape data storage devices, but has wider applicability. FIG. 3 shows the main components of a magnetic tape storage device. A tape 4 contained in a housing 3 provides the data-holding medium upon which data is stored. A read head 2 is provided to read data from the tape 4 and produce a data signal 1 fed to processing circuitry 5. The processing circuitry 5, in general, communicates with external devices via a port 7.

Figure 1:
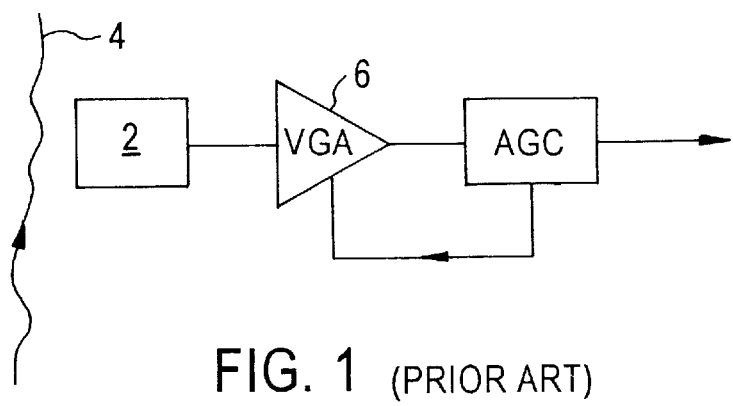
FIG. 1 shows a prior art arrangement for processing a signal generated by a read head.
Figure 2:
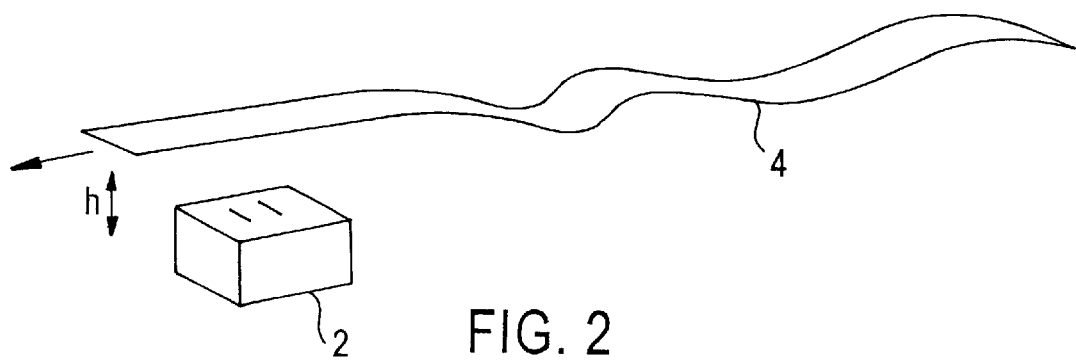
FIG. 2 shows a length of tape moving past a data reader.

As illustrated in FIG. 2 the distance (h) between the read head 2 and the tape 4 can vary due to amongst other things undulations in the tape. It will be appreciated that the data reader is arranged to produce an electrical output signal dependent upon the data stored on the tape 4. If the distance h varies then the amplitude of this electrical signal is increased or decreased from its nominal value due to the variation.

Figure 5:
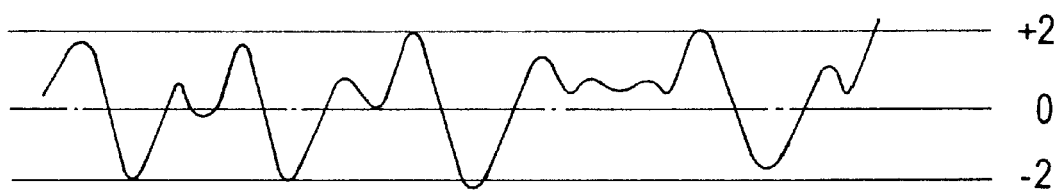
FIGS. 5 and 6 shows typical waveforms that may be generated within the data storage device.
Figure 6:
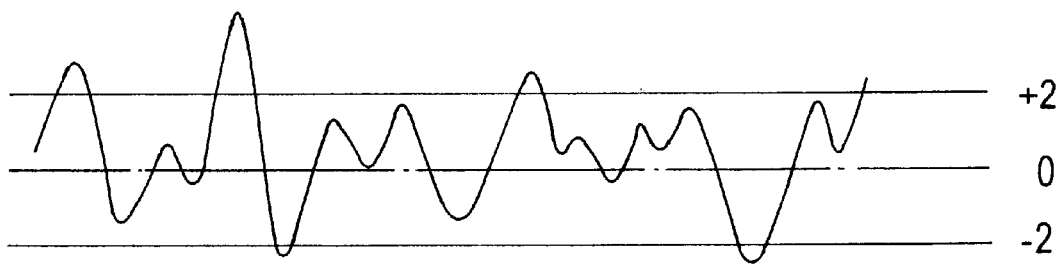

FIG. 5 shows a typical wavefront, with the waves shown at the correct amplitude, whereas FIG. 6 shows the same waveform that has undergone some, random, amplification due to variation in the distance h. The encoding scheme used on magnetic tape data storage is sensitive to this amplitude variation. The amplitude variation can make it problematic to accurately decode data held on the tape 4 and it is therefore desirable to remove these amplitude variations.

Figure 4:
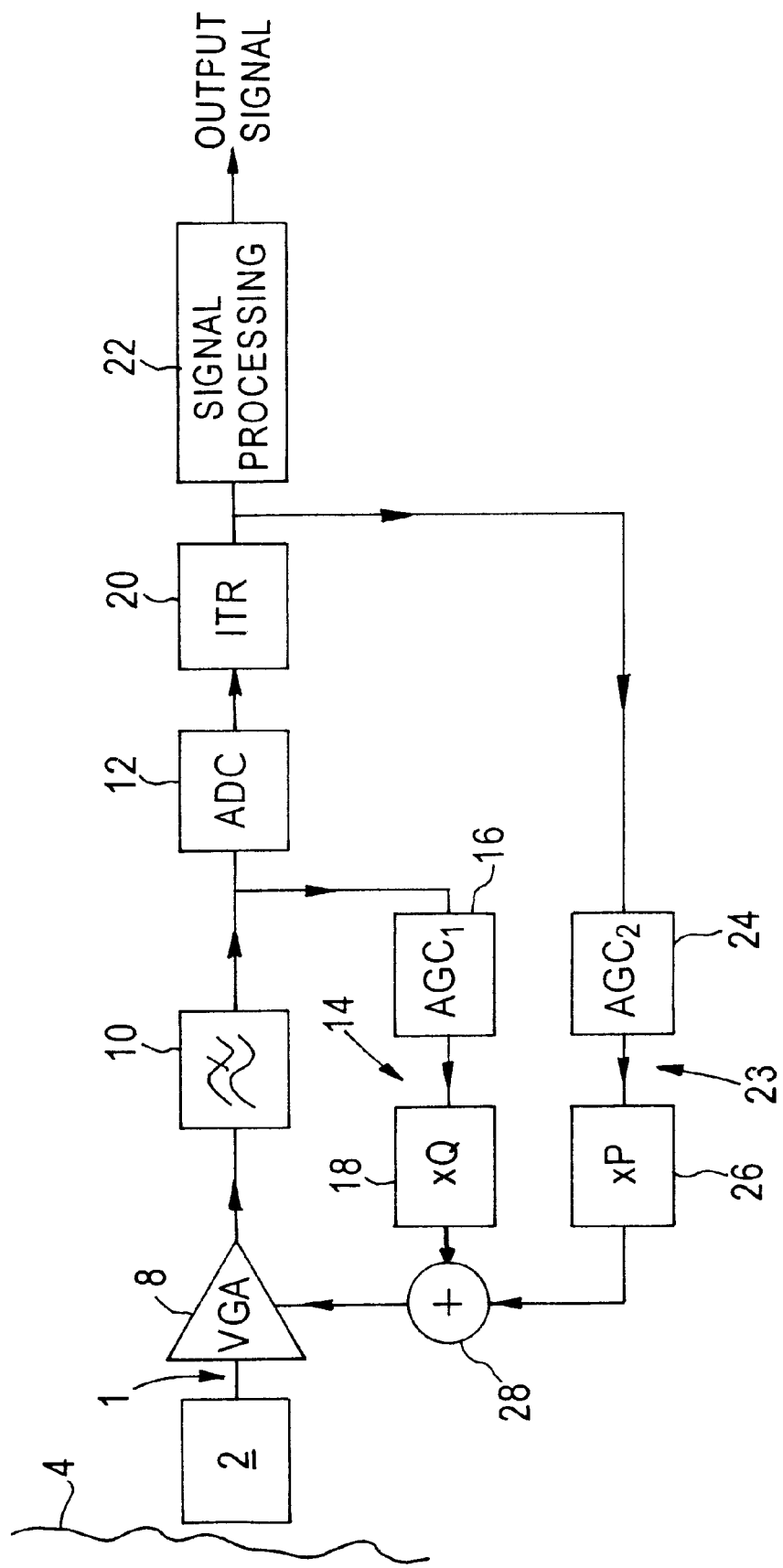
FIG. 4 schematically shows a block diagram of the components of a data reader according to the invention.

Therefore, according to the invention there is provided a data reader as shown in FIG. 4, which is included in the processing electronics 5 of the storage device A read head 2 is provided to read data from the tape 4 and produce a data signal 1. A variable gain amplifier (VGA) 8 is provided to amplify the data signal produced by the read head 2. The output of the VGA 8 is passed to a low pass filter 10, which is used to remove unwanted, high frequency, noise. After the low pass filter 10 the signal is fed to both an analogue to digital converter (ADC) 12 that digitises the signal, and to a first feedback loop 14. The first feedback loop 14 comprises an analogue automatic gain control (AGC) 16 followed by a scaler 18 having a scale factor Q to scale the output of the AGC 16. This analogue AGC 16 relies on a thresholding to adjust the gain of the VGA 8. If the signal input to it exceeds certain thresholds then the gain of the VGA 8 is adjusted accordingly. The AGOC 16 takes as its input the analogue signal passing through the filter 10 and produces a first feedback signal that is scaled by the scaler 18.

The output of the ADC 12 is fed to an interpolating timing recovery digital-processing block (ITR) 20 that generates data samples at the appropriate instances ready for detection by the signal-processing block 22. When data is written to the data-holding medium it is written at specific time intervals. When the read head reads data an analogue signal is produced, producing a continuous signal. The ADC 12 digitises the analogue signal, and the ITR selects or generates appropriate samples from the digital stream corresponding to the written data at the specific time intervals.

The signal from the ITR in addition to being fed to the signal-processing block 22 is fed to a second feedback loop 23. The second feedback loop comprises a digital automatic gain control (AGC) 24 together with a second scaler 26 having a scale factor P to scale the output of the AGC 24. The ITR 20 includes a 20-bit shift register, which introduces latency into the digital AGC 24: 20 samples must be processed before a change at the input affects the output that is fed to the AGC 24. The digital AGC takes as its input the digital signal produced by the ITR 20 and produces a second feedback signal, which is scaled by the scaler 26.

The digital AGC 24 compares sequences of adjacent ITR 20 output samples to the ideal amplitude level. The digital AGC 24 output depends on the difference between the ITR 20 output sample and the ideal sample values or levels.

The outputs of both the first 14 and the second 23 feedback loops are fed to a summer 28 that adds the first and second feedback signals produced by the two AGC's 16,24 to produce a summed feedback signal. The summed feedback signal output from the summer 28 is used to control the gain of the variable gain amplifier 8.

In use the read head 2 generates a data signal according to data previously written to the tape 4. The amplitude of this signal can be modified due to variations in the distance between the tape 4 and the read head 2. Therefore, the gain of the variable gain amplifier is controlled such that the amplitude variations are removed allowing the signal corresponding to the data to be successfully decoded.

Figure 7:
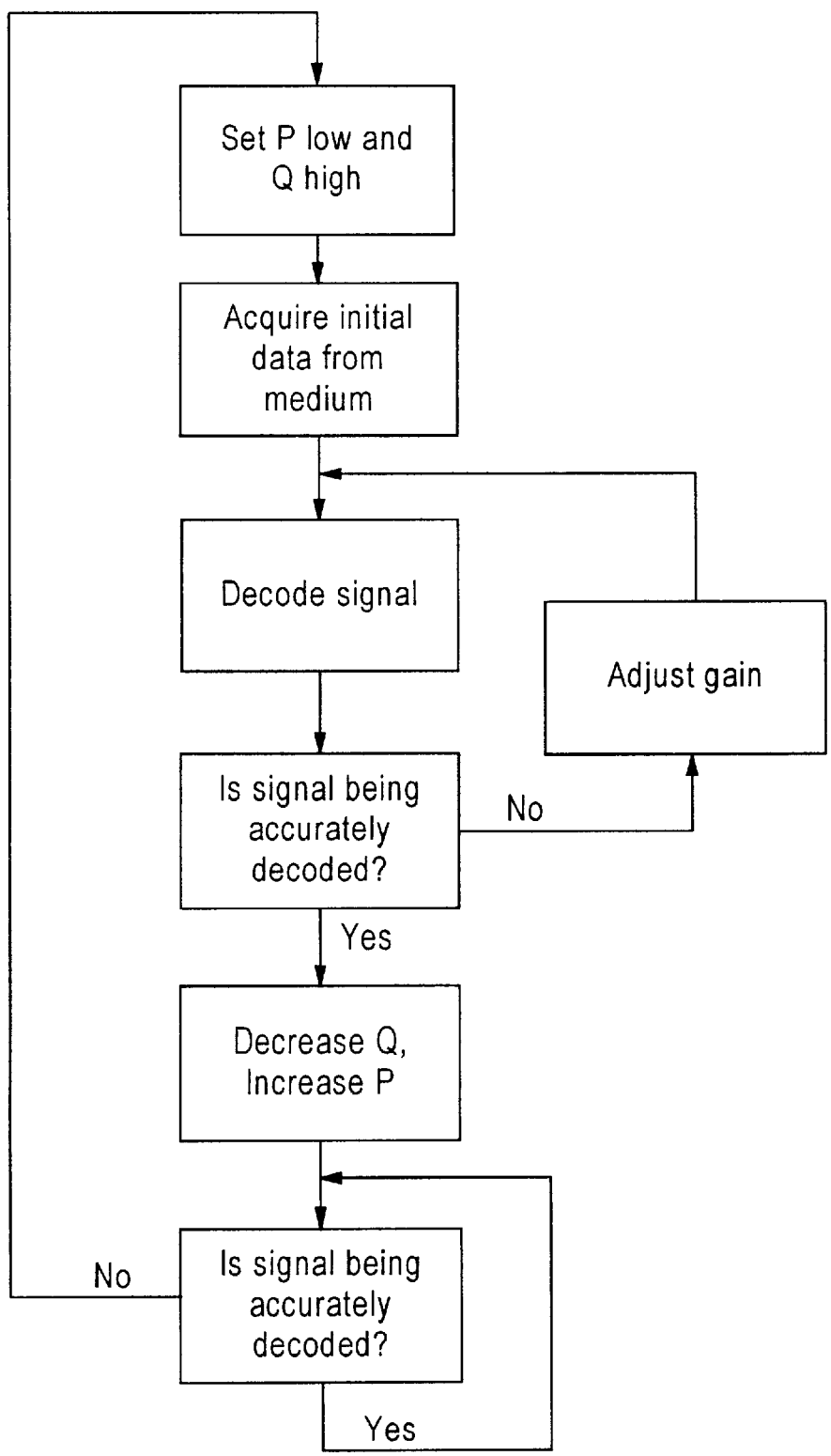
FIG. 7 shows a flow chart for the method running on the data reader.

FIG. 7 shows a flow chart outlining how the circuit shown in FIG. 4 is operated. When the circuit is first started the gain of the VGA 8 could be quite inaccurate, therefore, the scaling factor Q of the scaler 18 is set high, and the scaling factor P of the scaler 26 is set low. Such an arrangement of scaling factors causes the analogue AGC 16 to have more weight on the gain of the VGA 8 than the digital AGC 24. It is desired to obtain a reasonably accurate gain for the VGA 8 as soon as possible and therefore making more weight of the analogue AGC 16 is desirable due to the shorter time response of the analogue AGC 16.

As a lock is achieved (and so one therefore concludes that the gain of the VGA 8 is accurate) the scale factor Q of the scaler 18 is decreased and the scale factor P of the other scaler 26 is increased. As such the value of the scale factors P and Q are interrelated. Thus, more weight is applied to the output of the digital AGC 24. Once the gain of the VGA 8 is roughly correct it is desirable to apply more weight to the digital AGC 24 due to its higher accuracy when compared to the analogue AGC.

Once the scaling factors P, Q have been so adjusted, they generally remain such that increased weight is applied to the digital AGC 24 unless lock of the gain is lost. In such a case, the value of Q is again increased and the value of P decreased such that gain can be acquired quickly. Both feedback loops remain active to provide varying feedback signals during a data reading operation while their respective scaling factors P, Q are increased or decreased appropriately.

However, P and Q may be adjusted again if it is desired to operate the data reader in a special mode (for example an error handling mode). This special mode may alter the values of P and Q independently.

It is determined whether or not the gain of the amplifier is locked by statistical analysis on the data output by the signal-processing block 22. In the magnetic tape storage device of this embodiment data is stored onto the tape 4 using PRML encoding (Partial Response Maximum Likelihood) in which the transition between neighbouring bits is encoded. Such encoding produces an output from the ITR 20, which has three levels (minus, zero, and positive).

It can be determined whether or not the VGA 8 has the correct gain by checking whether or not there is on average the correct number of each levels output from the ITR 20. If on average, there are too many positive and minus levels then the gain of the VGA 8 is too high: If however, there are too many zeros being output by the signal-processing block then the gain of the VGA 8 is too low.

Although this invention has so far been described in relation to a magnetic tape storage device it is applicable to any other type of storage device wherein the read head can move relative to the medium on which data is stored, or where the data signal can vary. Examples of such storage device are hard disk drives, CDROMS, DVD ROMS/RAMS.

In other embodiments the data reader may be arranged to receive the data signal across a communication medium. The communication medium may be across a cable, or via an electro-magnetic wave, or via an acoustic wave, etc. For example the data may used in any one of the following devices: mobile phones, devices communicating by cables, infrared channels, printers, etc. The communication medium may be an IRDA link, a network connection (such as ETHERNET, SCSI, FIREWIRE, FIBRECHANNEL, USB, etc.)

The skilled person will appreciate that processing circuitry can include various types of circuitry and could include a processor or digital signal processing circuit or the like. Of course, such a processor would then be instructed by a program controlling its function.

What is claimed is:

1. An apparatus adapted to be responsive to a signal derived by a transducer, the signal having random fluctuations in amplitude due to anomalies in energy coupled to the transducer, the apparatus comprising:

circuitry including: a signal input adapted to be responsive to the signal, a variable gain amplifier connected to be responsive to the signal input, and a signal output connected to be responsive to the variable gain amplifier, first and second circuits connected to be responsive to the signal output of the circuitry for respectively deriving first and second feedback signals for controlling the gain of the amplifier, the first circuit including an analog gain control circuit, the second circuit being arranged for causing the second feedback signal to have a series of constant values, each determined by the signal at the signal output of the circuitry during different successive time intervals, the first and second circuits and the variable gain amplifier being arranged so the first and second feedback signals can simultaneously affect the gain of the amplifier.

2. The apparatus of claim 1 wherein the first circuit is arranged for causing the first feedback signal to have an effect on the gain of the amplifier only in response to the signal at the signal output of the circuitry exceeding a threshold.

3. The apparatus of claim 2 wherein the first and second circuits and the variable gain amplifier are arranged for causing relative changes in the amounts that the first and second feedback signals can simultaneously affect the gain of the variable gain amplifier while the circuitry is deriving the signal at the signal output.

4. The apparatus of claim 3 wherein the second circuit includes an analog to digital converter connected to be responsive to the signal at the signal output of the circuitry.

5. The apparatus of claim 4 wherein the second circuit is arranged to derive the series of constant values by comparing an indication of the signal at the signal output of the circuitry with a reference over plural successive periods.

6. The apparatus of claim 5 wherein the circuitry includes a low pass filter connected to be responsive to the variable gain amplifier and for supplying the signal to the signal output of the circuitry.

7. The apparatus of claim 6 in combination with the transducer, the transducer comprising a head for a magnetic medium.

8. The combination of claim 7 wherein the transducer comprises a head for reading a magnetic tape medium.

9. The apparatus of claim 1 wherein the first and second circuits and the variable gain amplifier are arranged for causing relative changes in the amounts that the first and second feedback signals can simultaneously affect the gain of the variable gain amplifier while the circuitry is deriving the signal at the signal output.

10. The apparatus of claim 1 wherein the second circuit includes an analog to digital converter connected to be responsive to the signal at the signal output of the circuitry.

11. The apparatus of claim 1 wherein the second circuit is arranged to derive the series of constant values by comparing an indication of the signal at the signal output of the circuitry with a reference over plural successive periods.

12. The apparatus of claim 1 wherein the circuitry includes a low pass filter connected to be responsive to the wearable gain amplifier and for supplying the signal to the signal output of the circuitry.

13. The apparatus of claim 1 in combination with the transducer, the transducer comprising a head for a magnetic medium.

14. The combination of claim 13 wherein the transducer comprises a head for reading a magnetic tape medium.

15. An apparatus adapted to be responsive to a signal derived by a transducer, the signal having random fluctuations in amplitude due to anomalies in energy coupled to the transducer, the apparatus comprising:

circuitry including: a signal input adapted to be responsive to the signal, a variable gain amplifier connected to be responsive to the signal input, and a signal output connected to be responsive to the variable gain amplifier, first and second circuits connected to be responsive to the signal output of the circuitry for respectively deriving first and second feedback signals for controlling the gain of the amplifier, the first and second circuits and the variable gain amplifier being arranged so the first and second feedback signals can simultaneously affect the gain of the amplifier, the first and second circuits and the variable gain amplifier being arranged for causing relative changes in the amounts that the first and second feedback signals can simultaneously affect the gain of the variable gain amplifier while the circuitry is deriving the signal at the signal output.

16. The apparatus of claim 15 wherein the first circuit is arranged for causing the first feedback signal to have an effect on the gain of the amplifier only in response to the signal at the signal output of the circuitry exceeding a threshold.

17. The apparatus of claim 16 wherein the first circuit includes an analog gain control circuit.

18. The apparatus of claim 15 wherein the second circuit includes an analog to digital converter connected to be responsive to the signal at the signal output of the circuitry.

19. The apparatus of claim 18 wherein the second circuit is arranged to derive a series of successive constant values by comparing an indication of the signal at the signal output of the circuitry with a reference over plural successive periods.

20. The apparatus of claim 15 wherein the circuitry includes a low pass filter connected to be responsive to the wearable gain amplifier and for supplying the signal to the signal output of the circuitry.

21. The apparatus of claim 15 in combination with the transducer, the transducer comprising a head for a magnetic medium.

22. The combination of claim 21 wherein the transducer comprises a head for reading a magnetic tape medium.

23. An apparatus adapted to be responsive to a signal derived by a transducer, the signal having random fluctuations in amplitude due to anomalies in energy coupled to the transducer, the apparatus comprising:

circuitry including: a signal input adapted to be responsive to the signal, a variable gain amplifier connected to be responsive to the signal input, and a signal output connected to be responsive to the variable gain amplifier, first and second circuits connected to be responsive to the signal output of the circuitry for respectively deriving first and second feedback signals for controlling the gain of the amplifier, the first and second circuits and the variable gain amplifier being arranged so the first and second feedback signals can simultaneously affect the gain of the amplifier, the first circuit including an analog gain control circuit, the second circuit including an analog to digital converter.

24. The apparatus of claim 23 wherein the first circuit is arranged for causing the first feedback signal to have an effect on the gain of the amplifier only in response to the signal at the signal output of the circuitry exceeding a threshold.

25. The apparatus of claim 23 wherein the second circuit is arranged for causing the second feedback signal to have a series of constant values, each determined by the signal at the signal output of the circuitry during different successive time intervals.

26. The apparatus of claim 25 wherein the second circuit is arranged to derive a series of successive constant values by comparing an indication of the signal at the signal output of the circuitry with a reference over plural successive periods.

27. The apparatus of claim 23 the first and second circuits and the variable gain amplifier are arranged for causing relative changes in the amounts that the first and second feedback signals can simultaneously affect the gain of the variable gain amplifier while the circuitry is deriving the signal at the signal output.

28. The apparatus of claim 23 wherein the circuitry includes a low pass filter connected to be responsive to the variable gain amplifier and for supplying the signal to the signal output of the circuitry.

29. The apparatus of claim 23 in combination with the transducer, the transducer comprising a head for a magnetic medium.

30. The combination of claim 29 wherein the transducer comprises a head for reading a magnetic tape medium.

31. An apparatus adapted to be responsive to a signal derived by a transducer, the apparatus comprising a variable gain amplifier arrangement having an input terminal connected to be responsive to the signal and an output terminal, an analog gain control circuit having an input connected to be responsive to an output signal at the output terminal, an analog to digital converter having an input connected to be responsive to the output signal at the output terminal, and circuitry connected to be responsive to an output signal of the analog gain control circuit and an output signal of the analog to digital converter for causing the gain of the variable gain amplifier to be simultaneously controlled in response to gain control output signals resulting from the output signals of the analog gain control circuit and the analog to digital converter, the circuitry being arranged for causing both of the gain control output signals to be derived in response to the same instantaneous value of the output signal at the output terminal of the variable gain amplifier arrangement.

32. The apparatus of claim 31 wherein the variable gain amplifier arrangement includes a low pass filter for deriving an output signal adapted to be coupled to the output terminal of the variable gain amplifier arrangement.

33. The apparatus of claim 31 wherein the analog gain control circuit is arranged to have an effect on the gain of the amplifier only in response to the output signal at the output terminal exceeding a threshold.

34. The apparatus of claim 31 wherein the circuitry for causing the gain of the amplifier to be controlled is arranged for causing the gain control signal associated with the analog to digital converter to have a series of constant values, each determined by the signal at the output terminal of the variable gain amplifier during different successive time intervals.

35. The apparatus of claim 34 wherein the circuitry for causing the gain of the amplifier to be controlled is arranged for causing successive outputs of the analog to digital converter associated with several different samples the converter takes of the output signal of the variable gain amplifier arrangement to result in a constant amplitude signal for a time period associated with the duration of the samples, and the circuitry for causing the gain of the amplifier to be controlled includes a comparator for comparing the constant amplitude signal with a reference, the comparator being arranged to derive the series of constant values.

36. The apparatus of claim 31 wherein the circuitry for causing the gain of the amplifier to be controlled is arranged for causing relative changes in the amplitudes of the gain control signals that are adapted to be derived by the analog gain control circuit and the analog to digital converter while the analog gain control circuit and the analog to digital converter are responsive to the same instantaneous value of the output signal at the output terminal of the variable gain amplifier arrangement.

37. An apparatus adapted to be responsive to a signal derived by a magnetic medium transducer, the apparatus comprising:

circuitry including: a signal input adapted to be responsive to the signal, a variable gain amplifier connected to be responsive to the signal input, and a signal output connected to be responsive to the variable gain amplifier, first and second circuits connected to be responsive to the signal output of the circuitry for respectively deriving first and second feedback signals for controlling the gain of the amplifier, the first and second circuits and the variable gain amplifier being arranged so the first and second feedback signals can simultaneously affect the gain of the amplifier.

38. The apparatus of claim 37 in combination with the transducer.

39. The apparatus of claim 38 wherein the transducer is for transducing magnetic flux variations of a magnetic tape.

40. An apparatus adapted to be responsive to a signal derived by a magnetic medium transducer, the apparatus comprising:

circuitry including: a signal input adapted to be responsive to the signal, a variable gain amplifier connected to be responsive to the signal input, and a signal output connected to be responsive to the variable gain amplifier, first and second circuits connected to be responsive to the signal output of the circuitry for respectively deriving first and second feedback signals for controlling the gain of the amplifier, the first and second circuits and the variable gain amplifier being arranged for causing both of the first and second feedback signals to be derived in response to the same instantaneous value of the output signal at the output terminal of the variable gain amplifier arrangement.

41. The apparatus claim 40 in combination with the transducer.

42. The apparatus of claim 41 wherein the transducer is for transducing magnetic flux variations of a magnetic tape.

* * * * *